(12) United States Patent
Fock et al.

(10) Patent No.: US 10,225,755 B2
(45) Date of Patent: Mar. 5, 2019

(54) NON-INTRUSIVE LINK MONITORING

(71) Applicant: Deutsche Telekom AG, Bonn (DE)

(72) Inventors: Gunnar Fock, Bonn (DE); Thomas Sieredzki, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/682,557

(22) Filed: Aug. 22, 2017

(65) Prior Publication Data

US 2018/0063732 A1 Mar. 1, 2018

(30) Foreign Application Priority Data

Aug. 24, 2016 (EP) .................................... 16185456

(51) Int. Cl.
| | | |
|---|---|---|
| *H04B 17/00* | (2015.01) | |
| *H04W 24/08* | (2009.01) | |
| *H04L 12/721* | (2013.01) | |
| *H04W 40/12* | (2009.01) | |
| *H04L 12/26* | (2006.01) | |
| *H04W 76/10* | (2018.01) | |
| *H04W 24/02* | (2009.01) | |
| *H04L 12/24* | (2006.01) | |
| *H04W 24/06* | (2009.01) | |

(52) U.S. Cl.
CPC ......... *H04W 24/08* (2013.01); *H04L 43/0829* (2013.01); *H04L 43/0852* (2013.01); *H04L 43/0894* (2013.01); *H04L 43/50* (2013.01); *H04L 45/70* (2013.01); *H04W 40/12* (2013.01); *H04L 41/5019* (2013.01); *H04W 24/02* (2013.01); *H04W 24/06* (2013.01); *H04W 76/10* (2018.02)

(58) Field of Classification Search
CPC ..... H04W 24/08; H04W 40/12; H04W 76/10; H04W 24/02; H04W 76/02; H04L 45/70
USPC ........ 455/67.11, 67.14, 67.16; 370/248, 252, 370/395.2, 230
See application file for complete search history.

(56) References Cited

U.S. PATENT DOCUMENTS

| | | | |
|---|---|---|---|
| 7,889,697 B2* | 2/2011 | Chen ....................... | H04L 29/06 370/331 |
| 2005/0058083 A1 | 3/2005 | Rogers | |
| 2007/0168591 A1* | 7/2007 | Chua ....................... | G10L 25/69 710/72 |
| 2012/0224495 A1 | 9/2012 | Lafleur et al. | |
| 2013/0272260 A1* | 10/2013 | Bitran .................... | H04W 76/10 370/329 |
| 2014/0003382 A1* | 1/2014 | Hukkanen ............. | H04W 76/10 370/329 |
| 2014/0092736 A1 | 4/2014 | Baillargeon | |

(Continued)

*Primary Examiner* — Edward F Urban
*Assistant Examiner* — Max Mathew
(74) *Attorney, Agent, or Firm* — Leydig, Voit & Mayer, Ltd.

(57) ABSTRACT

A method for monitoring utilization of a first connection in a mobile network includes: establishing an independent second connection, wherein the second connection is assigned a lower priority than the first connection and competes with the first connection for resources in the mobile network; sending test data having a low data volume via the second connection; and detecting reception of the test data. Complete reception of the test data indicates that the first connection is not fully utilized.

14 Claims, 1 Drawing Sheet

(56) References Cited

U.S. PATENT DOCUMENTS

| | | | |
|---|---|---|---|
| 2016/0062879 A1* | 3/2016 | Tan | G06F 11/3688 |
| | | | 714/38.1 |
| 2017/0171156 A1* | 6/2017 | Schultz | H04L 63/0272 |
| 2017/0223114 A1* | 8/2017 | Erringer | H04L 67/104 |
| 2018/0026837 A1* | 1/2018 | Wen | H04W 72/12 |
| | | | 370/328 |
| 2018/0103366 A1* | 4/2018 | Aramoto | H04W 8/02 |

* cited by examiner

NON-INTRUSIVE LINK MONITORING

CROSS-REFERENCE TO RELATED APPLICATIONS

Priority is claimed to European Patent Application No. EP 16 185 456.7, filed on Aug. 24, 2016, the entire disclosure of which is hereby incorporated by reference herein.

FIELD

The invention relates to a method and a system for monitoring the utilization of a first connection to be monitored in a data network that in particular comprises a mobile network.

BACKGROUND

It is known that network operators need to monitor and/or to document for subsequent proof their fulfillment of SLAs ("service level agreements") that they have made with their clients. In SLAs of this kind, the clients are guaranteed specific data rates for their data traffic that do not necessarily need to be constant. This is the case in particular when the network operator has guaranteed the provision of data rates that are above specific threshold values and when these data rates are requested by the client. It is possible, for example, for a client to be guaranteed a data rate having a threshold value of 10 Mbit/s for 50% of its data traffic and a threshold value of 20 Mbit/s for the remaining 50% of its data traffic. If these data rates exceptionally could not be provided on account of a particularly high network utilization, the client would be able to make a claim against the network operator on the basis of the agreement. In order to counter these claims, it is expedient for the network operator to monitor the utilization of the first connection provided for the client, which is proportional to the guaranteed data rate.

In this case, systems known so far do not directly provide any parameters, in particular the achievable data rate, for recording. Although it is possible to utilize the system, as a test, up to the load limit, this is impossible during normal operation since it has a negative influence on not only the individual connection but rather on the entire system. At worst, load tests of this kind contribute to the inability to meet contractually agreed values in other parts of the overall system. There are currently two approaches for monitoring the current availability and/or the utilization:

On the one hand, the currently used data rate on the first connection can be directly measured at the destination. If said rate is above the agreed threshold value, the SLA is deemed to be met. However, if the data rate is below the threshold value, it is unclear whether the client is currently requesting too low a data rate, or whether the system is unable to provide a desired higher data rate. Using this approach, it is therefore not possible to differentiate between whether the client is requesting a data rate that is below the agreed threshold value and the system is providing this data rate, or whether the system can currently only provide a lower data rate that is below the threshold value, although the client actually requires a higher data rate. This approach is therefore inadequate for monitoring the SLA.

On the other hand, as already mentioned above, in periods of low loading, within the context of a load test, an additional load can be introduced into the system up to the load limit in order to assess the achievable data rate. However, since the currently available data rate is unknown, an artificially generated additional load is applied to the system up to the full utilization, with the result that a portion of the actual payload cannot be processed. Moreover, this artificially generated load affects other regions of the overall system, and therefore agreed SLAs can no longer be met in other regions of the overall system.

Known methods are based on direct intervention in the system and on measuring intrasystem parameters, it being possible, for example, for packet losses in the event of an overload, or two-way propagation delays, to be determined as parameters of this kind. Measurements using special packets of different sizes are also known, which measurements make it possible to measure subsystems ("variable packet size probing"). Other methods are based on absolute one-way propagation delay measurements or on measuring relative propagation delays between packets in the payload stream. In any case, all the known methods presuppose that the payload transmission and the monitoring of the overload situation take place in the same logical connection.

In methods having direct intervention in the existing system, and when measuring intrasystem parameters, the system has to be modified from time to time since it is exceptional for a system to be able to determine the current maximum available data rate for a logical connection and report this to the outside. In the case of systems having a plurality of subsystems, said subsystems each have to support different configurations of logical connections. Finally, the achievable data rate on a logical connection is usually dependent not only on external system parameters, but also on the amount of data transmitted on the other logical connections.

The methods that are based on measuring packet losses in the event of an overload are similar to conventional Transmission Control Protocol (TCP) methods. Said methods proceed from the assumption that no packet losses occur as long as the connection is operated below the utilization limit. However, in systems that inherently operate with packet losses, this assumption is only inadequately fulfilled. Using TCP on the data connection itself also results in the control mechanisms keeping the packet losses low by implicitly reducing the data rate. This again makes differentiation from the event of lower data rate demand difficult.

The methods that are based on measuring two-way propagation delays are also part of the (optional) TCP mechanisms for controlling data amounts. For this purpose, it is necessary to modify the payload headers. Nonetheless, fluctuating propagation delays influence the results. Moreover, monitoring specific data rate threshold values is difficult in all methods based on propagation delay, since the correlation between the relative system utilization and the changes in the propagation delays is indirect and can only be determined quantitatively to an extent.

The above-mentioned "variable packet size probing" is imprecise and requires the insertion of special data packets of a not insignificant size, which packets thus cause a significant additional load.

In addition to the need for precise time references at the end points, methods that are based on one-way propagation delay measurements presuppose that queues are the sources of delays and delay changes in the overall system. However, this can be presupposed only in a few systems. Thus, mobile communications systems, specifically, use connections having markedly different propagation delays, between which it is also necessary to swap during the lifetime of a connection.

Furthermore, the payload has to intervene in the connection in order to introduce markers for determining the propagation delays.

Finally, methods based on measuring relative propagation delays also require packets to be inserted into the payload stream. Since methods of this kind react in a sensitive manner even to changes in the payload throughput that are below the utilization limit, they are not suitable for monitoring the utilization of a connection to be tested.

SUMMARY

In an exemplary embodiment, the present invention provides a method for monitoring utilization of a first connection in a mobile network. The method includes: establishing an independent second connection, wherein the second connection is assigned a lower priority than the first connection and competes with the first connection for resources in the mobile network; sending test data having a low data volume via the second connection; and detecting reception of the test data. Complete reception of the test data indicates that the first connection is not fully utilized.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
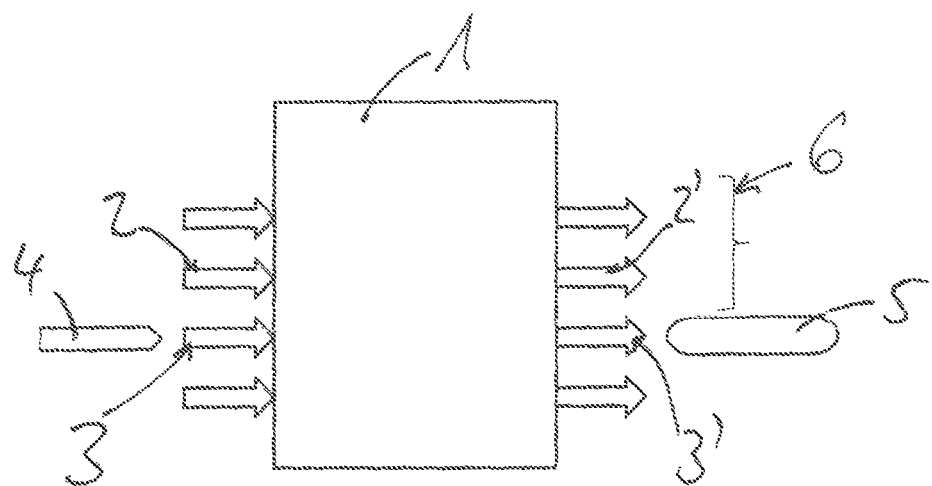
FIG. 1 shows a measurement being made on a second connection.

Exemplary embodiments of the invention provide a method and a system for monitoring the utilization of the first connection to be tested. The method and system can be implemented in a simple manner, do not require disruptive intervention in the running system, and deliver precise results.

Exemplary embodiments of the invention provides that, in addition to the first logical connection to be monitored, a second independent logical connection is established, which connection is, however, assigned a lower priority compared with the first connection. This means that data packets that are intended to be sent via the first connection have priority over packets on the second connection. Moreover, the second connection competes with the first connection for the data rate in the data network. Thus, when the total data rate available in the data network is used by the first connection, there is no data rate remaining for the second connection, and therefore data sent via said second connection do not reach their destination.

In this set-up, according to the invention, test data in the form of small data packets having a low data volume are then sent via the second connection. The reception of these test data at the destination is detected. If the small amount of test data can pass through the data network at least almost completely despite the lower priority, this indicates that the first connection had not yet been fully utilized and that therefore even more data could have been transmitted in the first connection. If, in contrast, no test data arrive, this indicates that the network capacity therefore is fully taken up by the first connection. Depending on the implementation, the non-transmitted data packets are either temporarily stored and delivered later, or are completely discarded.

Thus, detection of the test data being received at the destination indicates that the system is not yet fully utilized at the time of the measurement. If the network operator can prove that the test data have been received for the entire duration of the first connection, the client has no grounds for calling into question the fulfilment of the SLA.

In this case, in the context of the invention, "small data packets having a low data volume" is intended to mean packets that are of such a size that the data volume thereof does not noticeably load the available capacity of the network. In this case, it has also been found to be advantageous for the test data to be sent in packets having a data rate of between 10 bytes and at most 100 Kbytes per second. Ultimately, the smaller the data packets, the more sensitively the utilization of the first connection can be measured.

Furthermore, it should be noted at this point that the first logical connection to be monitored can be part of a complex overall connection consisting of a plurality of individual logical sub-connections for which, in particular, the network operator is responsible. The measurement according to the invention made on an overall connection is then used to determine the capacity of the bottleneck of the overall connection.

As set out above, reception of the test data indicates that the first connection is not yet fully utilized. However, test data not being received at the destination does not necessarily mean that a data rate guaranteed in the SLA was not available, since the client could have been using an excessive data rate compared with the guaranteed rate at the time of the measurement. In this case, too, no test data would have been transmitted via the second connection, but the client would likewise have no grounds for calling the SLA into question. Nonetheless, it is particularly advantageous for the network operator to also determine, as continuously as possible while said connection is ongoing, the payload data throughput via the monitored first connection at the destination, in addition to determining the reception of the test data. Said operator can then compare the payload data rate thus determined with a specified, in particular a contractually guaranteed, data rate, and ascertain whether the data rate guaranteed in the SLA has been exceeded. The combined measurement of the reception of the test data and the payload allows the network operator to meet any requirement to prove that it has fulfilled its obligations.

Using this combined approach, it is thus possible to generate measured values that make it possible to evaluate whether or not the data rate guaranteed in the SLA has been achieved. As described, for this purpose, the data rate currently achieved is advantageously determined and in addition checked with regard to whether this data rate is limited by the current low requirement of the client, or by the current system capacity. This is deemed to be non-fulfillment of the SLA only if the limitation is due to the system capacity.

Compared with the methods known thus far, the approach according to the invention makes it possible to continuously and completely monitor whether the SLA is being met with regard to the data rate without inadmissibly loading the system. The method according to the invention merely causes minimal interaction with the payload streams to be monitored, since said method is based on the use of the independent logical second connection. Moreover, the approach according to the invention is characterized by high sensitivity combined with minimal influence on the parameters to be monitored. The method is also relatively simple to implement in technical terms.

Using the additional logical connection that has lower priority results in a far more measurable effect when the system is overloaded than is the case in systems in which the measurements are carried out in the same logical connection that also carries the payload to be monitored. In addition, the method described here is robust with respect to changing system-induced propagation delays during the measurement process.

The determination the current state of the first connection, and thus of the system/subsystem to be monitored, at the destination of the packets or at an intermediate point can be ascertained by the payload data rate currently arriving at the destination/intermediate point. The current utilization state of the first connection can, however, also be determined by measuring a parameter.

For documentation purposes, it is particularly advantageous for the test data to be sent in a defined temporal sequence and for the corresponding reception of the test data to be recorded for protocol purposes. The more data packets that are sent per unit of time, the higher the temporal resolution of the measurement. It is advantageous in particular for the test data to be sent continuously while the first connection is ongoing.

Furthermore, it is advantageous for a specific parameter to be determined when the test data are received, which parameter makes it possible to draw conclusions regarding whether the utilization of the first connection has been reached, and thus whether the capacity limit of said connection has been reached. This parameter may be a packet loss, a packet propagation delay that is increased relative to a threshold value, a change in the packet propagation delay, or an analysis of a difference in packet propagation delay. In addition, other methods may also be used that are suitable for detecting the utilization of a single logical connection.

In a particular embodiment, the test data packets are provided with markers, in particular sequence numbers and/or time stamps being used as markers.

In the payload stream, too, data packets can be marked with sequence numbers and/or time stamps so as to be able to compensate for a possible load-independent delay of the data packets on the logical connections. Moreover, the marked data packets in the payload stream can be analyzed for the purpose of compensating load-independent delays. The payload is manipulated in this case.

In order to prevent manipulation of the payload, it may be expedient to send additional calibration data having a low data volume via the first connection, which data are formed only by small data packets marked with sequence numbers and/or time stamps, it being sufficient in principle to send sequence numbers and/or time stamps alone as calibration data. These calibration data can then be used in the manner mentioned for calibrating the test data received via the second connection.

The classes specified by the standard of the connection in each case, for example Quality of Service (QoS) Class Identifier (QCI) classes, are advantageously used for prioritizing a connection. The second connection is thus assigned a lower priority class than the first connection. If the first connection has already been assigned the lowest priority class, it is advantageous to increase this in order to make the lowest priority class available for the second connection.

In another embodiment, the system state can be aggregated over a plurality of monitoring intervals and made available for further postprocessing.

Overall, it is advantageous for documentation purposes if the results are stored and/or transmitted. In this case, the results can alternatively be transmitted via the system to be measured or in another manner.

According to the invention, measured values are thus provided, on the basis of which it is possible to assess whether or not a SLA has been met with respect to the achievable data rate. For this purpose, firstly the data rate currently achieved is determined, and secondly a check is carried out as to whether this data rate is limited by the current low requirement of the client or by the current system capacity. This is deemed to be non-fulfillment of the SLA if the limitation is due to the system capacity. In this invention, the two sub-aspects of the measurement are implemented on different logical connections. According to the invention, the second logical connection has a lower priority than the first logical connection that is to be monitored, but competes for the same resources as the first logical connection that is actually to be monitored.

The approach according to the invention can be used in all systems that allow the use of logical connections having different priorities and strictly take account of these priorities when assigning resources. This is the case, for example, in cellular mobile communications systems having QoS handling (QCI), in the IP environment (802.1p, 802.1q, TOS, DSCP) and, with restrictions, also in a wireless local area network (WLAN) (802.11e).

FIG. 1 shows a data network 1 that is shown simply as a "black box" and that can implement various logical connections having different prioritizations. In the present case, four connections are shown by incoming and outgoing arrows. In this case, the first connection, having a priority of N, is shown by the incoming arrow 2, and a second connection, having a priority of N−1, is shown by the incoming arrow 3. The respective outgoing arrows 2' and 3' indicate the other side of the connection in each case. Test data 4 are sent in the second connection 3, and the reception of the test data is detected at the end 5 of the connection 2. Sending the test data does not have any influence on the higher priority connections that are indicated by the bracket 6. The utilization of the first connection 2 is determined, as described, by the reception or the lack of reception of the test data.

Figure 2:
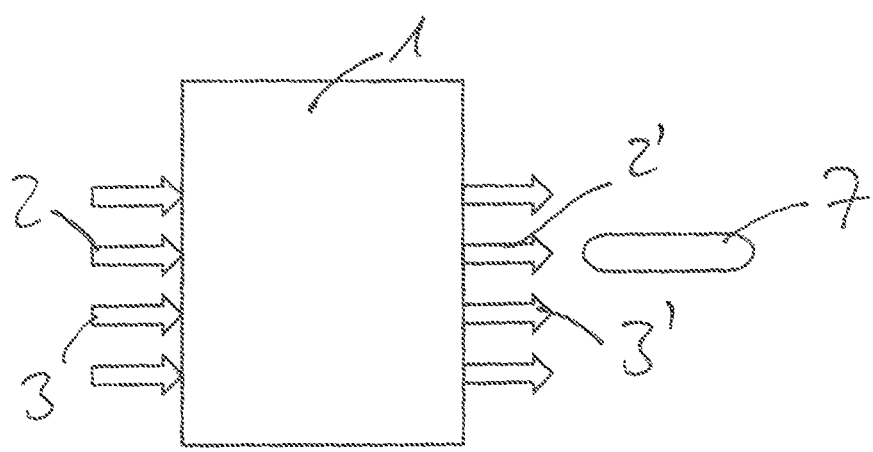
FIG. 2 shows a measurement being made on a second connection.

FIG. 2 shows the same system, the monitoring of the test data not being shown for reasons of clarity. In this case, only the data throughput of the monitored first connection 2 at the destination 7 is determined and is compared with a specified, in particular a contractually guaranteed, data rate.

Combining the two methods results in reliable proof of the extent to which a SLA has been met with regard to the achievable data rate.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a"

or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for monitoring utilization of a first connection in a mobile network, comprising:
   establishing an independent second connection, wherein the second connection is assigned a lower priority than the first connection and competes with the first connection for resources in the mobile network;
   sending test data having a low data volume via the second connection; and
   determining whether or not the first connection is fully utilized based on whether or not the test data is received via the second connection, wherein complete reception of the test data via the second connection indicates that the first connection is not fully utilized.

2. The method according to claim 1, wherein data throughput in the first connection is determined at a destination and is compared with a specified data rate.

3. The method according to claim 1, wherein the test data are sent in a defined temporal sequence and reception of the test data is recorded for protocol purposes.

4. The method according to claim 3, wherein the test data are sent continuously while the first connection is ongoing.

5. The method according to claim 1, wherein a parameter is determined when the test data are received for determining whether full utilization of the first connection has been reached, wherein the parameter corresponds to a packet loss, an increased packet propagation delay, a change in the packet propagation delay, or a difference in packet propagation delay.

6. The method according to claim 1, wherein the test data includes packets provided with markers, wherein the markers are sequence numbers and/or time stamps.

7. The method according to claim 1, wherein the test data are sent in packets having a data rate of between 10 bytes and 100 Kbytes per second.

8. The method according to claim 1, wherein standardized classes are used for the prioritization, and the second connection is assigned a lower priority class than the first connection.

9. The method according to claim 8, wherein a higher priority class is used for the first connection if the lowest priority class was previously used for the first connection.

10. The method according to claim 1, wherein calibration data having a low data volume are sent on the first connection, wherein the calibration data are used for calibrating the test data received via the second connection.

11. The method according to claim 1, wherein detecting reception of the test data facilitates monitoring the fulfillment of service level agreements ("SLA") between a network operator and a client.

12. A system, comprising:
    a client; and
    a mobile network of a network operator;
    wherein a first connection exists between the mobile network and the client;
    wherein the mobile network is configured to: establish an independent second connection, wherein the second connection is assigned a lower priority than the first connection and competes with the first connection for resources in the mobile network; send test data having a low data volume via the second connection; and determine whether or not the first connection is fully utilized based on whether or not the test data is received via the second connection, wherein complete reception of the test data indicates that the first connection is not fully utilized.

13. The method according to claim 1, wherein the resources in the mobile network include a data rate.

14. The system according to claim 12, wherein the resources in the mobile network include a data rate.

* * * * *